(12) United States Patent
Yehaskel

(10) Patent No.: US 11,080,346 B2
(45) Date of Patent: *Aug. 3, 2021

(54) SYSTEM AND METHOD FOR AUTOMATED RESPONSES TO INFORMATION NEEDS ON WEBSITES

(71) Applicant: LEAF GROUP LTD., Santa Monica, CA (US)

(72) Inventor: David M. Yehaskel, Austin, TX (US)

(73) Assignee: Leaf Group Ltd., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/653,321

(22) Filed: Oct. 15, 2019

(65) Prior Publication Data

US 2020/0042561 A1    Feb. 6, 2020

Related U.S. Application Data

(63) Continuation of application No. 15/676,763, filed on Aug. 14, 2017, now Pat. No. 10,467,301, which is a
(Continued)

(51) Int. Cl.
*H04L 29/08* (2006.01)
*G06F 16/951* (2019.01)
*H04L 12/58* (2006.01)

(52) U.S. Cl.
CPC .......... *G06F 16/951* (2019.01); *H04L 51/046* (2013.01)

(58) Field of Classification Search
CPC ............................. G06F 16/951; H04L 51/046
See application file for complete search history.

(56) References Cited

U.S. PATENT DOCUMENTS 6,175,830 B1    1/2001   Maynard
7,599,922 B1   10/2009   Chen et al.
(Continued)

FOREIGN PATENT DOCUMENTS

KR    1020090113158       10/2009
KR    1020100024722 A      3/2010
(Continued)

OTHER PUBLICATIONS

International Patent Application Serial No. PCT/US2011/042460, International Search Report and Written Opinion, dated Feb. 17, 2012.
(Continued)

*Primary Examiner* — Adnan M Mirza
(74) *Attorney, Agent, or Firm* — Greenberg Traurig

(57) ABSTRACT

Systems and methods are provided to automatically respond to questions on websites. An electronic communication comprising words is received over a network. In some embodiments, the electronic communication could comprise a message posted by a user on a social networking website. The words of the electronic communication are matched to words in prior search queries, where the prior search queries are associated with online content. A reply is then returned in response to the electronic communication. The reply comprises a representation of the online content, for example, a URL linking to the online content.

18 Claims, 8 Drawing Sheets

Related U.S. Application Data continuation of application No. 13/012,758, filed on Jan. 24, 2011, now Pat. No. 9,734,245.

(60) Provisional application No. 61/415,295, filed on Nov. 18, 2010.

(56) References Cited

U.S. PATENT DOCUMENTS

| | | |
|---|---|---|
| 7,809,664 B2 | 10/2010 | Heck |
| 9,734,245 B2 | 8/2017 | Yehaskel |
| 10,467,301 B2 | 11/2019 | Yehaskel |
| 2009/0254543 A1 | 10/2009 | Ber et al. |
| 2010/0082452 A1 | 4/2010 | Speers et al. |
| 2010/0131902 A1 | 5/2010 | Teran et al. |
| 2010/0235311 A1* | 9/2010 | Cao ............ G06F 16/9535 706/46 |
| 2010/0268716 A1 | 10/2010 | Degaugue et al. |
| 2011/0047171 A1 | 2/2011 | Paparizos et al. |
| 2012/0131112 A1 | 5/2012 | Yehaskel |
| 2017/0344642 A1 | 11/2017 | Yehaskel |

FOREIGN PATENT DOCUMENTS

| | | |
|---|---|---|
| WO | 2005098701 | 10/2005 |
| WO | 2012033561 | 3/2012 |

OTHER PUBLICATIONS

International Patent Application Serial No. PCT/US2011/042695, International Search Report and Written Opinion, dated Feb. 28, 2012.

International Patent Application Serial No. PCT/US2011/042688, International Search Report and Written Opinion, dated Feb. 29, 2012.

\* cited by examiner

US 11,080,346 B2

SYSTEM AND METHOD FOR AUTOMATED RESPONSES TO INFORMATION NEEDS ON WEBSITES

RELATED APPLICATIONS

This application is a continuation of U.S. patent application Ser. No. 15/676,763 entitled "System and Method for Automated Responses to Information Needs on Websites" filed on Aug. 14, 2017 which is a continuation of U.S. patent application Ser. No. 13/012,758, filed Jan. 24, 2011, now U.S. Pat. No. 9,734,245 issued on Aug. 15, 2017 and entitled "System and Method for Automated Responses to Information Needs on Websites", which claims priority to U.S. Provisional Application No. 61/415,295 entitled "System and Method for Automated Responses to Questions on Social Networking Websites," filed Nov. 18, 2010, which is hereby incorporated by reference in its entirety.

FIELD OF THE TECHNOLOGY

At least some embodiments disclosed herein relate, in general, to systems and methods relating to websites that allow users to communicate with one another, and more specifically for systems and methods for automating responses to information needs posed by users of such websites.

BACKGROUND

On the TWITTER social networking website and other social networking sites, users often and openly seek information and advice. Some sites are specifically meant for Q&A and others like the TWITTER social networking website simply contain some questions within the postings) Their requests can be explicit questions ("How do I kill roaches in my kitchen?"), or may be presented in the form of a statement with an implied need for information ("I wish I knew how to kill these roaches in my kitchen"). Social network users may ask their friends directly ("@friends_name which roach killer worked the best for you?"), or they might implicitly put their question out to the whole network ("Does anyone know a good way of killing roaches?"). These information requests can range from very general to very specific, and from very personal to completely impersonal. By their nature, some of these classifications are subjective, and no attempt is made to objectively classify information requests on websites.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
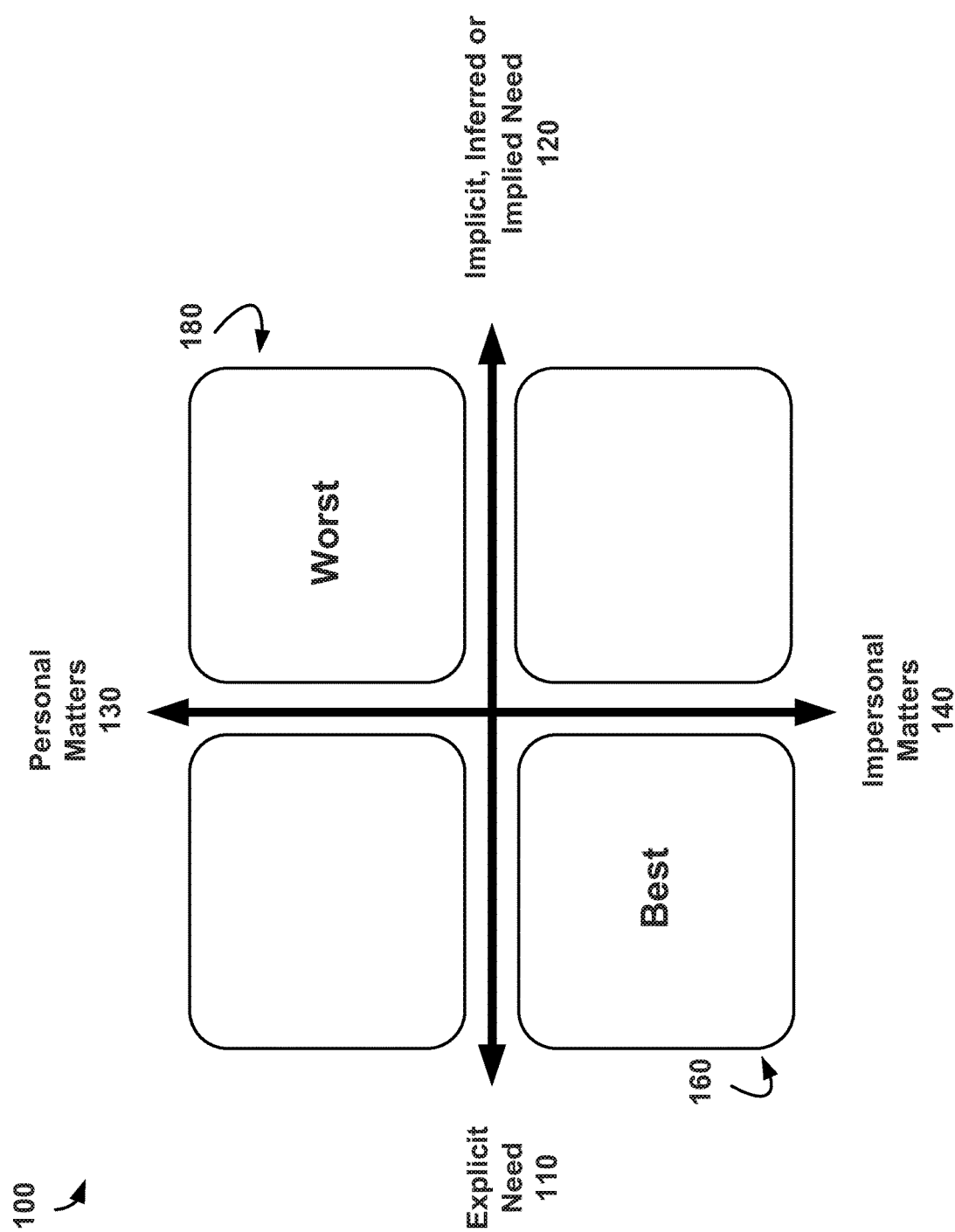
FIG. 1 illustrates a conceptual model of questions posted on social networking sites.

Users often post questions or implicitly express information needs on social networking sites relating to a variety of topics. FIG. 1 illustrates a conceptual model of the types of informational needs posted on social networking sites. The informational needs can be explicit 110, for example, "how can I format my hard drive?". The informational needs can also be implicit, inferred or implied 120. Such informational needs are not typically posted as questions, per se, but may take the form of declarative statements that may imply a potential need for information, for example, "I need to format my hard drive". Furthermore, the subject matter of explicit and implicit questions varies and can relate to personal matters 140, such as "where can I get treated for drug addiction?", or impersonal matters, such as "what cars get good gas mileage?".

There is a great deal of content available on the Internet that directly relates to a user's information needs. Accessing such content may, however, require a user to turn to other sources outside of social networking sites, such as search engines and content providers. Many types of informational needs, explicit or implicit, expressed on social networking websites can be analyzed and potentially matched to online content. Typically, the best candidates for matching to content are explicitly expressed needs relating to impersonal matters 160. On the other hand, the worst candidates 180 for matching to content are implicitly expressed needs relating to personal matters.

A High-Level Process Overview

Figure 2:
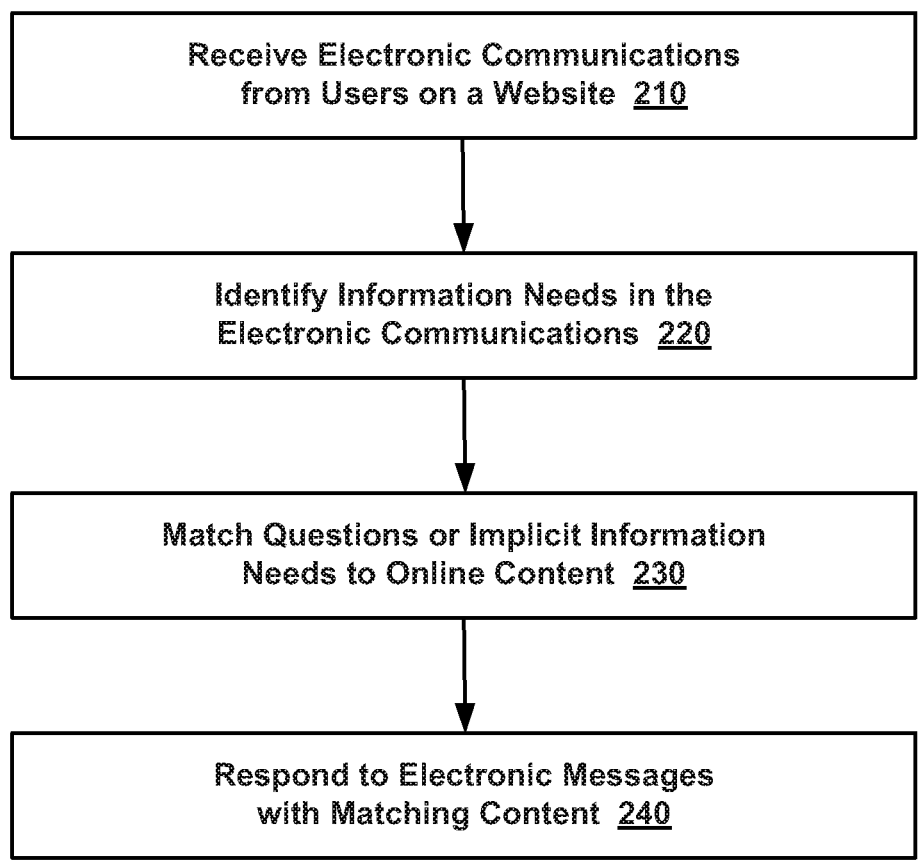
FIG. 2 illustrates a high level view of one embodiment of a process for linking messages on social networking websites to online content.

In various embodiments, the presently disclosed systems and methods provide an automated linkage between websites that allow users to interact with one another, such as Q&A sites such as, for example, the YAHOO! ANSWERS website and social networking sites such as, for example, the TWITTER microblogging website. FIG. 2 illustrates a high level view of one embodiment of a process 200 for linking messages on social networking websites to online content. Electronic communications are received 210 from one or more websites such as, for example, social networking websites like the FACEBOOK social networking website. Information needs, including explicit questions and/or implicit, implied or inferred information needs are identified 220 in the electronic communications.

The questions and/or implicit information needs are then matched 230 to online content (e.g. content provided by a content service provider.) In one embodiment, questions and/or implicit information needs are matched to online content using various indexing schemes. In one embodiment, online content is indexed by search queries from one or more sites that led users to the content. Such queries could originate from the site on which the online content is located and/or third party search services, such as the GOOGLE web search services. The matching content is then used to respond 240 to the electronic communications to which the content relates (e.g., as text or a link to the content).

A High-Level System Overview

Figure 3:
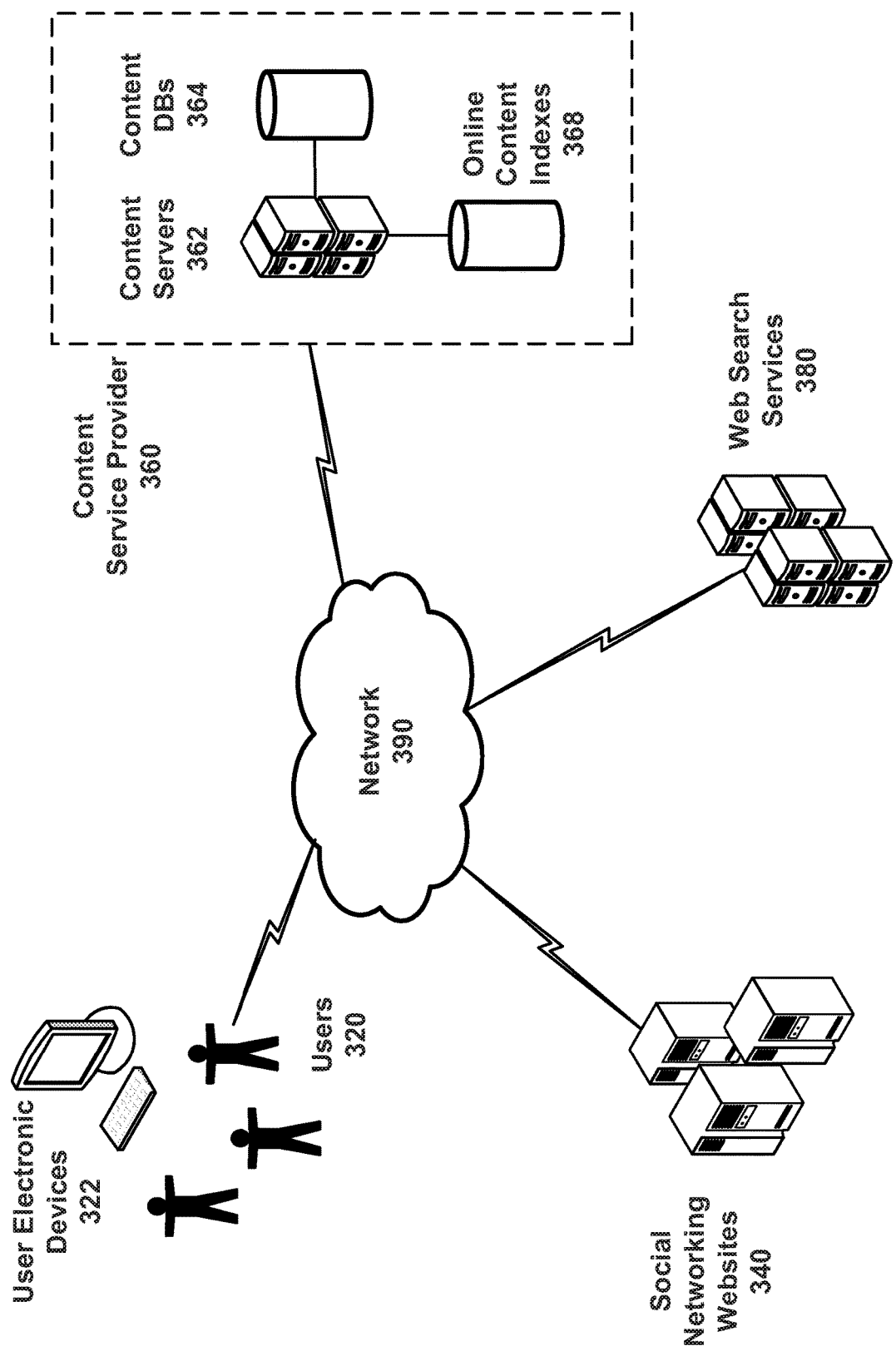
FIG. 3 illustrates a high level view of one embodiment of a system capable of supporting at least one embodiment of the process shown in FIG. 2.

FIG. 3 illustrates a high level view of one embodiment of a system capable of supporting at least one embodiment of the process shown in FIG. 3. Users 320, using user electronic devices 322, interact with one another via one or more social networking websites 340 over a network 390 such as the Internet. The term "social networking website" should be understood to broadly refer to any type of web sites where users can interact with one another by posting electronic communications. Such websites 340 could include websites such as the FACEBOOK social networking site and/or the TWITTER microblogging sites.

In one embodiment, the users 320 may, independently of social networking websites, access content provided by one or more content service providers 360. In one embodiment, such content service providers 360 aggregate content of various types, such as text articles and multimedia objects, relating to a wide range of topics. The content aggregated by the content service providers 360 could originate from multiple sources such as, for example, various public domain sources on the Internet and/or authors hired by the content service provider.

In one embodiment, the content service providers 360 store aggregated content in one or more online content databases 364 and index the content using one or more online content indexes 368. In one embodiment, such online content indexes 368 index online content by inherent properties of the content, such as titles, keywords and/or key phrases.

In one embodiment, the users 320 can query online content on the online content databases 364 using query facilities provided by the content service provider 360 or using query facilities provided by various web search services 380 such as, for example, the GOOGLE, YAHOO! and/or BING web search services.

In one embodiment, online content servers 362 access one or more of social networking websites 340 to retrieve electronic communications posted by the users 320 on the websites. In one embodiment, the online content servers 362 retrieve electronic communications from the social networking websites 340 using public APIs provided by the websites. In one embodiment, the online content servers 362 identify questions or implied information needs in such electronic communications, match the questions or implied information needs to online content stored on the online content databases 364 using the online content indexes 368, and post responses on the social networking websites to the applicable electronic communications. In one embodiment, the response comprises the online content or a representation of the online content, such as, for example, a link (e.g., a URL) to the online content.

The systems shown in FIG. 3 are purely illustrative, and other configurations are possible, as will be readily apparent to those skilled in the art. For example, online content aggregation and database services and content matching services could be provided by separate service providers.

Figure 4:
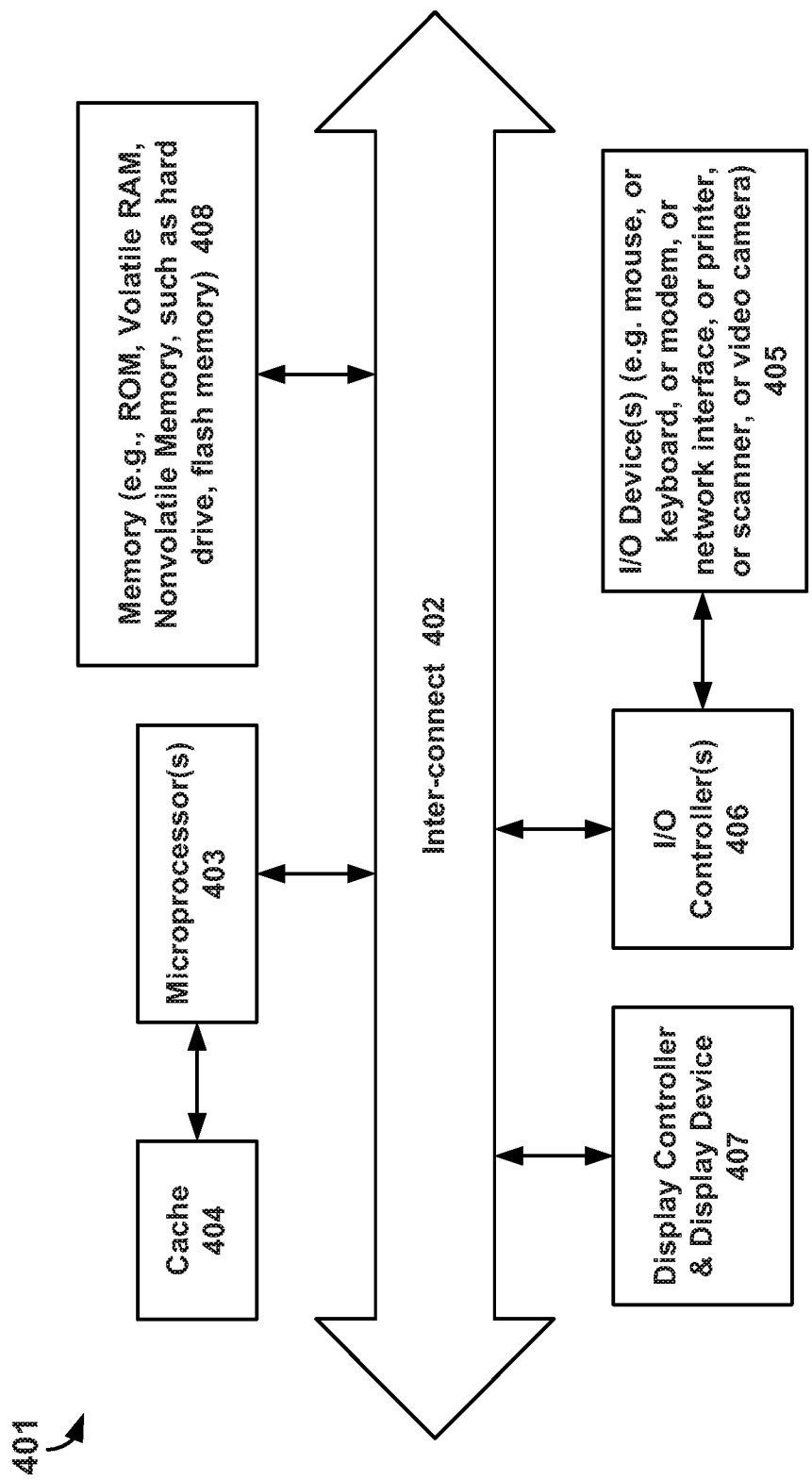
FIG. 4 shows a block diagram of a data processing system which can be used in various embodiments of the disclosed system and method.

FIG. 4 shows a block diagram of a data processing system which can be used in various embodiments of the disclosed system and method. While FIG. 4 illustrates various components of a computer system, it is not intended to represent any particular architecture or manner of interconnecting the components. Other systems that have fewer or more components may also be used.

In FIG. 4, the system 401 includes an inter-connect 402 (e.g., bus and system core logic), which interconnects a microprocessor(s) 403 and memory 408. The microprocessor 403 is coupled to cache memory 404 in the example of FIG. 4.

The inter-connect 402 interconnects the microprocessor(s) 403 and the memory 408 together and also interconnects them to a display controller and display device 407 and to peripheral devices such as input/output (I/O) devices 405 through an input/output controller(s) 406. Typical I/O devices include mice, keyboards, modems, network interfaces, printers, scanners, video cameras and other devices which are well known in the art.

The inter-connect 402 may include one or more buses connected to one another through various bridges, controllers and/or adapters. In one embodiment the I/O controller 406 includes a USB (Universal Serial Bus) adapter for controlling USB peripherals, and/or an IEEE-1394 bus adapter for controlling IEEE-1394 peripherals.

The memory 408 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, the online servers 362 of FIG. 3 can be implemented using one or more data processing systems as illustrated in FIG. 4. In some embodiments, one or more servers of the system illustrated in FIG. 4 can be replaced with the service of a peer to peer network or a cloud configuration of a plurality of data processing systems, or a network of distributed computing systems. The peer to peer network, or cloud based server system, can be collectively viewed as a server data processing system.

Embodiments of the disclosure can be implemented via the microprocessor(s) 403 and/or the memory 408. For example, the functionalities described above can be partially implemented via hardware logic in the microprocessor(s) 403 and partially using the instructions stored in the memory 408. Some embodiments are implemented using the microprocessor(s) 203 without additional instructions stored in the memory 408. Some embodiments are implemented using the instructions stored in the memory 408 for execution by one or more general purpose microprocessor(s) 403. Thus, the disclosure is not limited to a specific configuration of hardware and/or software.

Identifying Questions Or Implicit Information Needs In Electronic Communications Perhaps the majority of electronic communications on social networking websites do not relate to information needs at all. In one embodiment, the disclosed system and method applies a set of rules to inbound electronic communications to identify explicit questions or implicit information needs. In one embodiment, the disclosed system and method utilizes a rule-based processing system such as that described in "Rule-Based System and Method to Associate Attributes to Text Strings," U.S. patent application Ser. No. 12/828,200, filed Jun. 30, 2010, the entire disclosure of which is incorporated by reference in its entirety.

In one embodiment, the electronic communications are first processed to filter out communications with attributes that tend to indicate that the communications do not express a need for information. For example, consider TWEETS retrieved from the TWITTER microblogging website. In one embodiment, TWEETS that are "@replies", "RT" ("retweets"), obvious foreign text, and TWEETS that contain links in them can generally be discarded. While this may erroneously discard some communications that identify explicit questions or implicit information needs, the number of such errors is relatively small.

Additionally, such rules can be set to filter out less obvious patterns that imply the electronic communications do not relate to a need for information, for example, TWEETS that contain specific "hashtags" (a word in the electronic communication preceded by a #symbol) such as "#quote", or containing the name "Bieber" (as in Justin Bieber), or where the whole TWEET is fewer than five words may be discarded. In one embodiment, such rules could be designed to look for textual, part of speech, and other patterns in the electronic communications. Such rules could include rules relating to:
i. specific textual words or symbols,
ii. specific textual phrases and patterns,
iii. part-of-speech phrases and patterns,
iv. specific spelling errors and/or spelling error frequency, and/or
v. number of words.

In one embodiment, the electronic communications are then processed to identify messages with positive characteristics that indicate the communication could comprise an explicit question or implicit information need. In one embodiment, a set of rules can be defined that reflect characters (e.g. "?"), words (e.g. "how"), phrases (e.g. "how can I") and/or parts-of-speech patterns that tend to identify an explicit question or implicit information need. In one embodiment, additionally or alternatively, a classifier such as an SVM or another type of machine learning technology could be trained using a manually-labeled set of training data, and the classifier could then be used to identify electronic communications comprising explicit questions and/or implicit information needs.

Matching Questions or Implicit Information Needs to Online Content

Once electronic communications that appear to express an information need (such as explicit questions and/or implicit, inferred or implied needs) have been identified, the communications can be matched to online content responsive to such need.

In one embodiment, where a content service provider stores online content that is indexed by a title of the content, an electronic communication can be matched to content having titles that are similar to the communication. For example, content such as news articles or topical articles on various subjects typically have titles that summarize the basic content of the article. For example, if the body of an electronic communication includes "can someone tell me how to format a hard drive?" it can be matched to content, such as a topical article by a technical writer, having a title "How to Format a Hard Drive".

In one embodiment, where a content service provider stores online content that is indexed by keywords, an electronic communication can be matched to content associated with keywords in the communication. For example, content such as news articles or topical articles on various subjects can be associated with keywords that comprise important words, terms or concepts within the article. For example, a topical article by a technical writer having a title "How to Format a Hard Drive" could be associated with the keywords "format" and "hard drive". If the body of an electronic communication includes, for example, "can someone tell me how to format a hard drive?", the communication could be matched to the keywords "format" and "hard drive".

Matching questions to content titles and/or keywords associated with online content can provide good results in some cases. Because, however, there are so many ways to ask the same question (synonyms, word forms, etc.), it can be difficult at times to match an information need to an answer when the words used in each are so different. One solution to this problem is to compare the words in an electronic communication to search queries that were previously entered into a search engine that led users to online content.

In one embodiment, a content service provider stores online content that is indexed by search queries that were previously entered into one or more search engines that led users to online content. In such an embodiment, an electronic communication can be matched to content associated with search queries that are similar to the communication.

For example, consider the following table of a sampling of search engine queries that led users to online content entitled "How to Write Song Lyrics".

TABLE 1

A Sample of Queries Leading Users to Content Entitled "How to Write Song Lyrics"

| | | |
|---|---|---|
| writing song lyrics | how to wright a song how to make songs with words | lyrics for making your own song |

TABLE 1-continued

A Sample of Queries Leading Users to Content Entitled "How to Write Song Lyrics"

| | | | |
|---|---|---|---|
| how to write song lyrics | how to write good lyrics | how to right a song | lyrics: how to make a good song |
| how to write a song lyrics | make a song lyrics | how to wright a song lyrics | make lyrics of a song |
| how to write lyrics for a song | write a lyric for beginner | how to write a good song lyrics | make your own song |
| how to write lyrics to a song | blackfeelwite-song for a girl lyrics | how to write a music for a lyric | make your own song up |
| how to write songs lyrics | children write own song | how to write a song lyrics format | make your own song with lyrics |
| make your own lyrics to a song | easiest way to make your own lyrics | how to write good lyrics to a song | own compose song lyrics |
| how to right a song lyrics | how do you write songs | how to write lyrics to a song step by step | what to write lyrics about |
| make a song with lyrics online | how to compose a song lyrics | how to write simple song lyrics from the heart | write a song |
| how to make up your own song lyrics | how to make lyrics of a song | learn to write music lyrics | writing music lyrics for kids |
| | how to make music lyrics | love lyrics write | www.make your own english song.com |

As can be seen, many search queries contain the basic words of the title of the content "write", "song" and "lyrics", along with smaller, more common words such as "to", "a", "your", "for" and so forth. However, there are other search queries where different words are used, such as "compose" instead of "write", "words" instead of "lyrics", or "music" instead of "song".

Such search queries could be obtained from one or more sources. One such source is the log files of one or more websites through which a content provider provides users access to online content. In one embodiment, such log files include data related to search queries used to access the website and the referring websites for such queries. Additionally or alternatively, where the content provider's website provides query facilities that allow users to enter search queries for online content on the website (e.g. via a search box), the service provider could accumulate such queries along with data relating to the users and the online content the queries led users to view.

In one embodiment, the search queries can be filtered to either remove search queries that are likely to make poor matches (one-word queries as an example) and/or add weight to other search queries that are likely to make good matches (such as verbing a noun type of phrases).

In one embodiment, where users access online content provided by a content service provider via the results of search queries executed by users on third-party web search services such as, for example, the GOOGLE web search service, a content provider could purchase logs or other types of data from the providers of the web search services that includes such queries along with data relating to the online content the queries led users to view.

Since each of these search queries represent one or more actual users who performed a search and then clicked on the online content titled "How to Write Song Lyrics" from the search engine results page, it can be assumed that each of these queries, if they appear in a qualifying electronic communication, can be answered with that same corresponding piece of content. Thus, for example, when a TWEET contains the text, "I can't figure out what to write lyrics about", "I can't figure out" is a very good indicator of an informational need, and "what to write lyrics about" then is matched to the search query "what to write lyrics about" (as seen in Table 1) and in turn is matched to the specific piece of content titled "How to Write Song Lyrics".

In one embodiment, where the language and the style of at least some of the electronic communications on a particular website are vague, ambiguous, or significantly different from the language typically used in search queries, an online content index can be supplemented with manually created mapping rules tied to specific items of content. Consider, for example, some informational needs on the TWITTER microblogging website. There are thousands of TWEETS where the meaning of the text of the TWEET appears ambiguous when taken out of context, but can be easily inferred with knowledge of communication patterns on the website. For example, the word "this" in the text "How do I use this?" typically refers to TWITTER itself. In such cases, explicit rules can be created to deal with these electronic communications. In one embodiment, such rules can be applied to electronic communications before any attempt is made to match the communications to titles, keywords or search queries. In such embodiment, communications that match these rules can be referred to as "preferred matches".

In one embodiment, a content service provider stores online content that is indexed by search queries that were previously entered into one or more search engine that led users to online content. In such an embodiment, an electronic communication can be matched to content associated with search queries that are similar to the communication.

Responding to Electronic Messages With Matching Content

Figure 5:
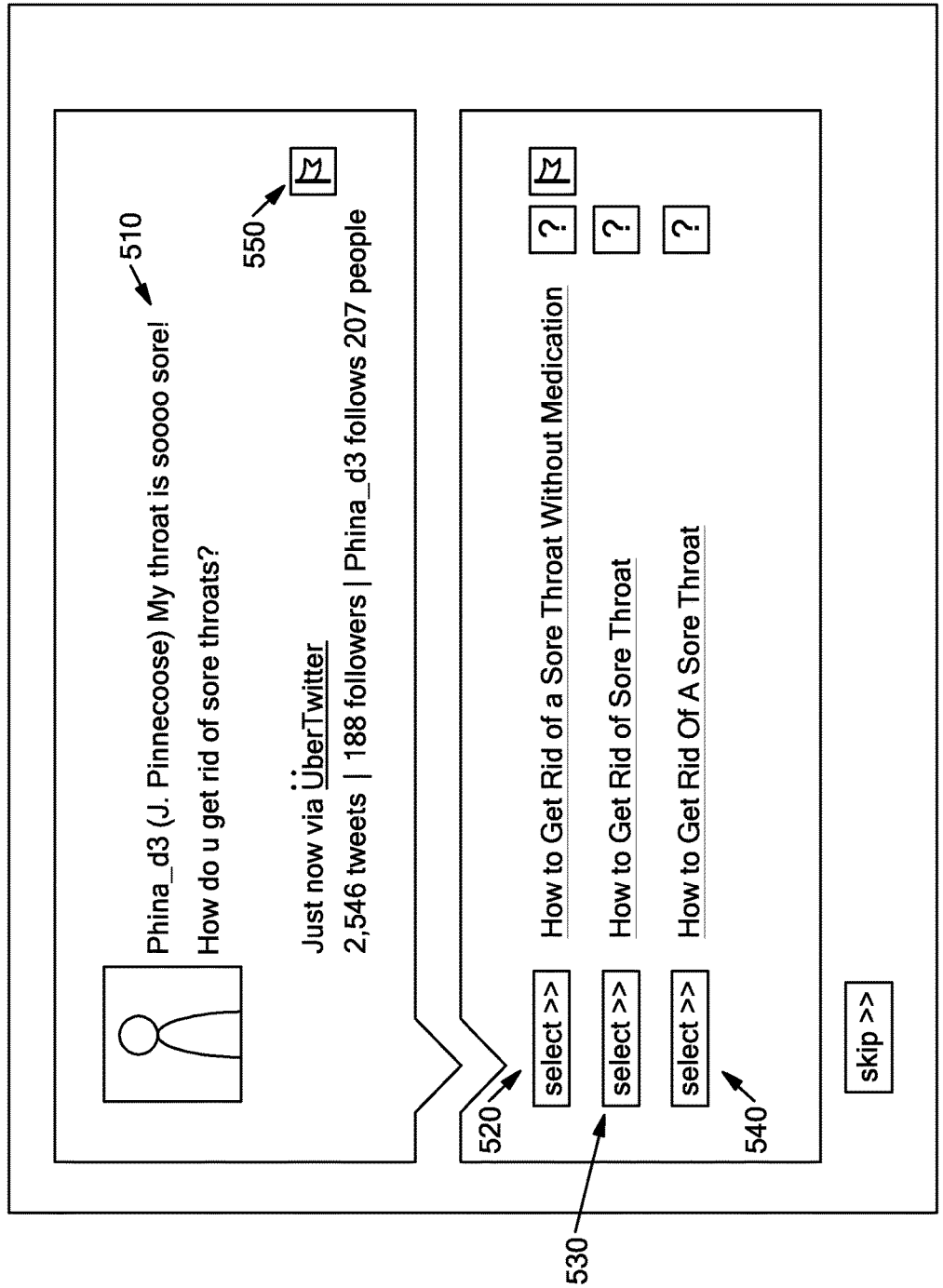
FIG. 5 illustrates one embodiment of a user interface presenting matching online content to a user for review and posting to the TWITTER microblogging website.
Figure 6:
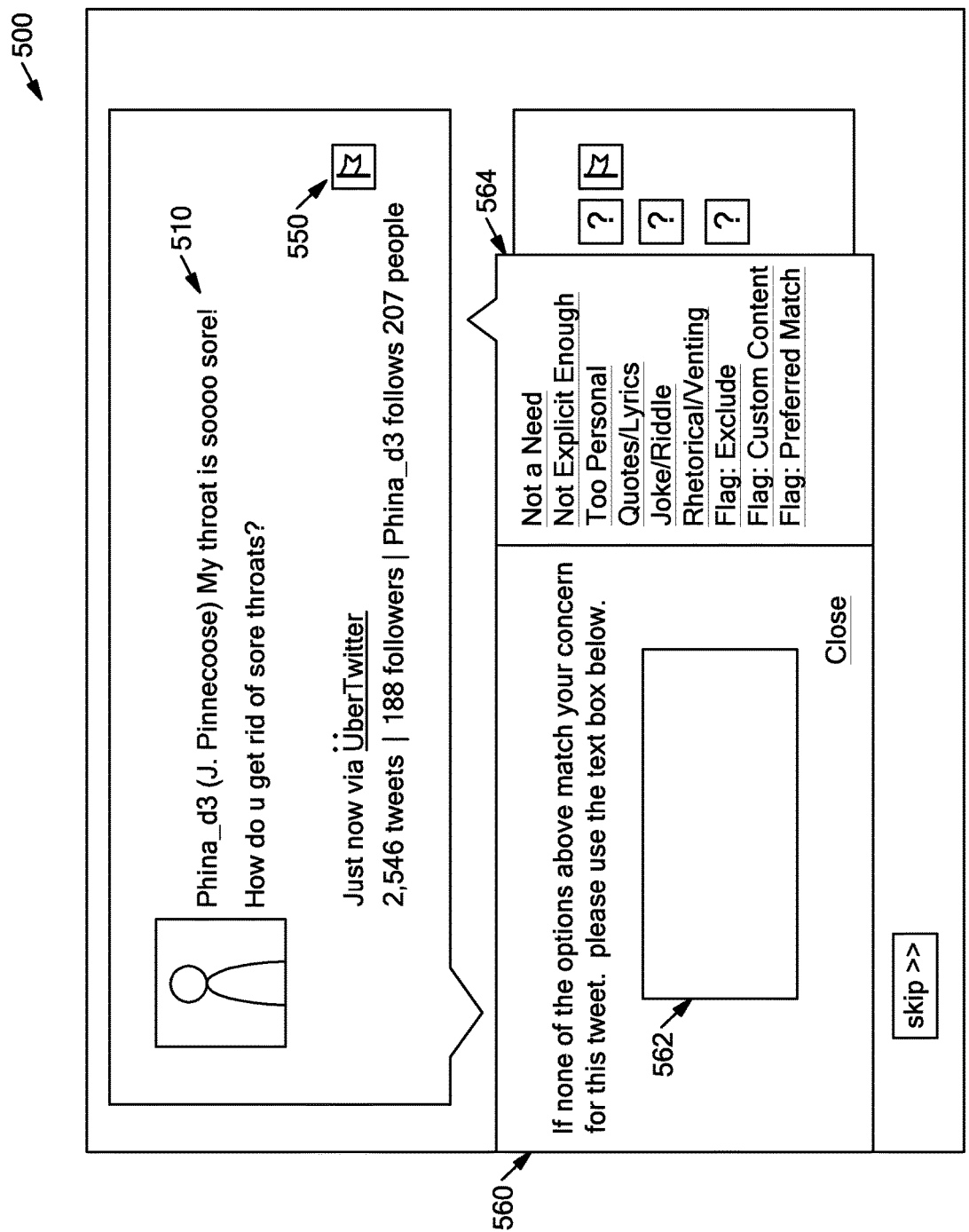
FIG. 6 illustrates the user interface of FIG. 5 further displaying a dialog box for providing user feedback.
Figure 7:
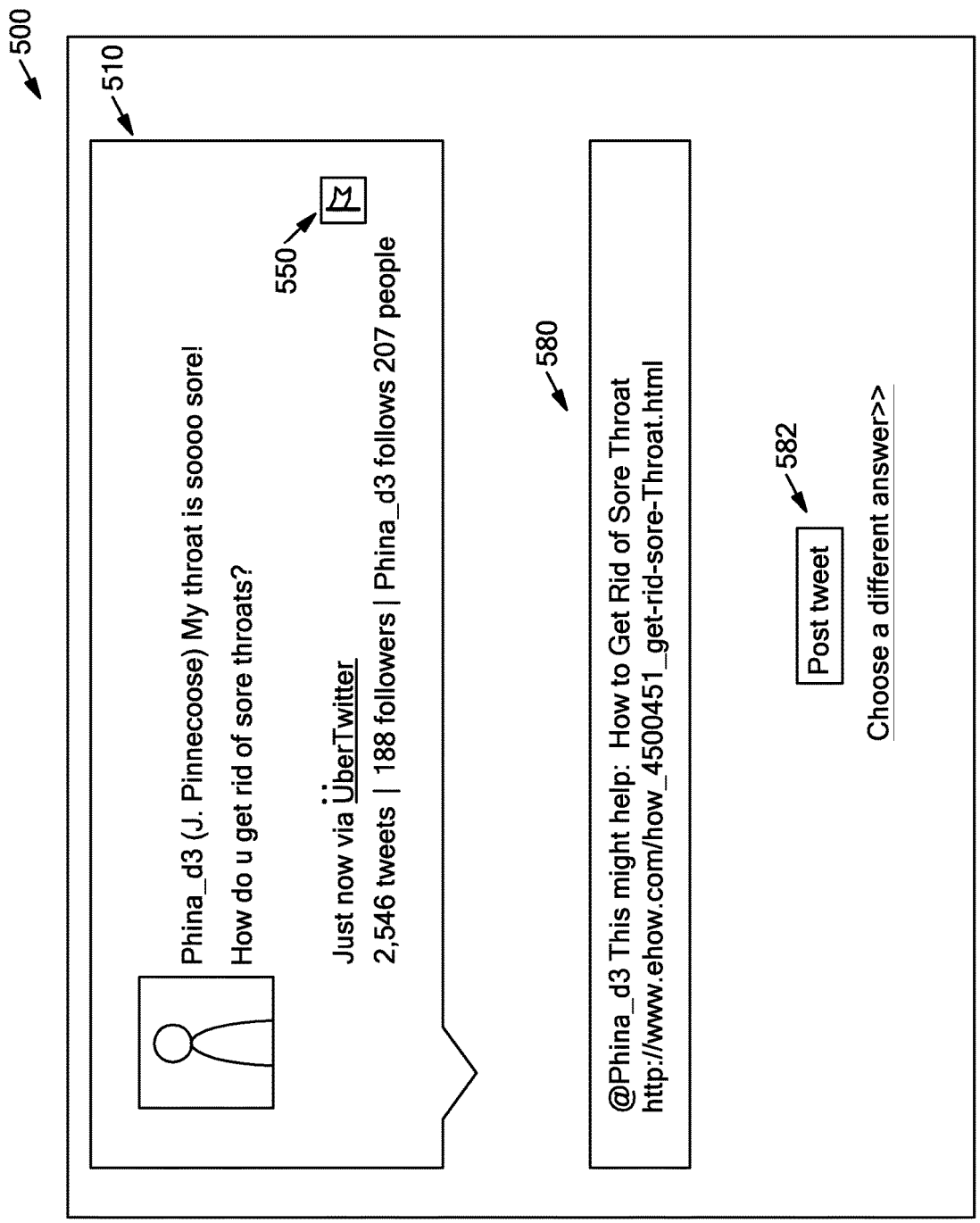
FIG. 7 illustrates the user interface of FIG. 5 displaying a link to an item of online content selected via the user interface of FIG. 5.

In one embodiment, electronic communications that have been matched to online content can then be presented to a user for review. In one embodiment, such matching content could be presented directly to the senders of such electronic communications. In one embodiment, such matching content could be presented to an employee of a content service for review prior to presenting the results to the senders of such electronic communications. FIGS. 5-7 illustrate one embodiment of a user interface 500 presenting matching online content to an employee of the content service for review and posting to the TWITTER microblogging website.

In FIG. 5, a sender has entered a TWEET 510 including the words "How do u get rid of sore throats". In response, the system has presented three matching content titles 520, 530 and 540 to a user, such as an employee of a content service. In one embodiment, if the user has a specific concern about the content being provided in response to the TWEET, the user provide can provide such feedback by clicking on a flag control 550.

In one embodiment, in response to a click on the flag control 550, a popup dialog box 560 is displayed as shown in FIG. 6. The dialog box allows the user to provide various types of feedback 564 to the system. For example, the user could label the TWEET as "Not a Need" (e.g. the TWEET does not actually state a need) or "Too Personal" (e.g. the TWEET relates to matters the user finds personally sensitive). The dialog box could also allow users to flag the TWEET as to be excluded (e.g. to be ignored by the system), as custom content or as a preferred match.

In one embodiment, feedback provided by the user could be used to develop a set of rules that are specific to the sender and which the system applies to all electronic communications created by the sender. In one embodiment, feedback provided by the user could be used to modify or refine system-wide rules which the system applies to electronic communications created by all users.

In one embodiment, if the user selects one of the matching titles, such as, for example, title 530 of FIG. 5 "How to Get Rid of Sore Throat", the system can then present the user with a message providing a link to the online content as shown in FIG. 7 that can be sent to the sender. In the illustrated embodiment, the user is presented with a proposed TWEET 580 which includes a URL to an item of online content relating to the selected title. If the user is satisfied with the proposed TWEET, the user can elect to post the TWEET for viewing by the sender (i.e. return a reply to the sender) by clicking on the user interface control 582.

In one embodiment, feedback may additionally or alternatively be received from the sender of the electronic communication relating to a reply posted by the system. Such feedback could be explicit or, more likely, implicit. For example, in the case of a reply TWEET, the sender could respond to the TWEET by clicking on a link in the TWEET, promoting the TWEET further, replying to the TWEET with a "thanks!", or retweeting the TWEET with negative comments.

Figure 8:
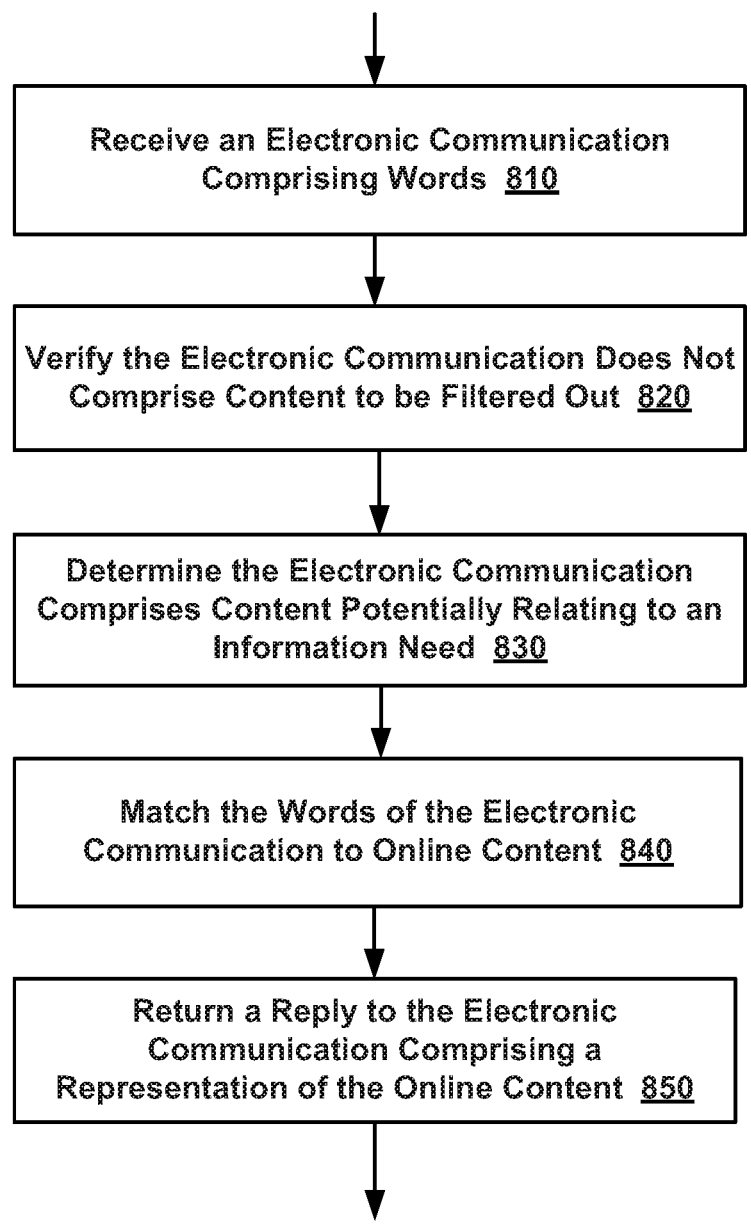
FIG. 8 shows one embodiment of an illustrative process for automated responses to information needs on social networking websites.

An Illustrative Process for Automated Responses to Questions on Social Networking Websites FIG. 8 illustrates one embodiment of a process for automated responses to questions on social networking websites. In one embodiment, one or more servers, such as the online content servers shown in 362 of FIG. 3, perform the operations of the method shown in FIG. 8, and online content databases and online content index databases such as that shown in 364 and 368 of FIG. 3 store the data collected and/or used by various operations of the method.

In block 810, one or more processes running on a server receive, over a network, an electronic communication comprising words. In one embodiment, the communication is received from a website, such as a social networking website, over the Internet. In one embodiment the communication is a message posted by a user on the website and potentially includes an explicit question or an implicit information need. In one embodiment, the communication is received via a data feed, such as the TWITTER firehose.

In block 820, one or more processes running on a server verifies that the electronic communication does not comprise content to be filtered out. In one embodiment, content to be filtered out comprises electronic communications that do not express a need for information. In one embodiment, content to be filtered out additionally or alternatively comprises electronic communications that are objectionable (e.g., communications that are obscene or racist). In one embodiment, content to be filtered out additionally or alternatively comprises content relating to sensitive personal matters (e.g., violence or drug addiction). In one embodiment, content to be filtered out additionally or alternatively comprises electronic communications that comprise foreign words. In one embodiment, content to be filtered out additionally or alternatively comprises electronic communications that comprise links to online content.

In one embodiment, content to be filtered out is defined by a set of rules supported by a rule-based processing system as described in detail above. In one embodiment, the set of rules can comprise rules that relate to specific words, specific phrases, part of speech patterns, spelling error frequency and/or number of words.

In block 830, one or more processes running on a server determine that the electronic communication comprises content that potentially relates to an information need. In one embodiment, content that potentially relates to an information need can include explicit questions or words or phrases that imply an implicit information need.

In one embodiment, a set of rules is applied to the words of the electronic communication to determine that the electronic communication comprises content that potentially relates to an information need. In one embodiment, the set of rules can comprise rules that relate to specific words, specific phrases, part of speech patterns, spelling error frequency and/or number of words.

In one embodiment, a classifier, such as a State Vector Machine (SVM), can be used to determine that the electronic communication comprises content that potentially relates to an information need. In one embodiment, one or more processes running on a server are used to train the classifier using a manually labeled set of training data including electronic communications comprising explicit questions and/or implicit information needs.

In block 840, one or more processes running on a server match the words of the electronic communication to online content as described in detail above. In one embodiment, the words of the electronic communication can be matched to online content having content titles similar to or identical to all or of a portion of the words of the electronic communication. In one embodiment, the words of the electronic communication can be additionally or alternatively matched to online content associated with keywords that are present in the words of the electronic communication. In one embodiment, the words of the electronic communication are additionally or alternatively matched to online content associated with prior search queries (i.e., queries issued in the past that matched the online content) that are similar to or identical to all or of a portion of the words of the electronic communication. In one embodiment, the words of the electronic communication are additionally or alternatively matched to online content associated with predefined rules that match all or of a portion of the words of the electronic communication.

In block 850, one or more processes running on a server return a reply to the electronic communication, wherein the reply comprises a representation of the online content. In one embodiment, the representation of the online content comprises a link, such as a URL, to the online content.

CONCLUSION

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
    receiving, over a network, an electronic communication comprising an explicit question by a user;
    matching, using a computing device, the electronic communication to words in prior search queries that have been previously stored, wherein the prior search queries are associated with online content;
    verifying that the electronic communication does not comprise content to be filtered out; and
    returning, over the network, a reply to the electronic communication, the reply comprising a representation of the online content.

2. The method of claim 1, wherein it is verified that the electronic communication does not comprise content to be filtered out by applying a set of rules to words of the electronic communication.

3. The method of claim 1, additionally comprising:
    determining that the electronic communication comprises content potentially relating to an information need of the user.

4. The method of claim 3, wherein the content potentially relating to an information need of the user comprises content that suggests the user is seeking information relating to a topic.

5. The method of claim 3, wherein it is determined that the electronic communication comprises content potentially relating to an information need of the user by applying a set of rules to words of the electronic communication.

6. The method of claim 3, wherein it is determined that the electronic communication comprises content potentially relating to an information need of the user by inputting words of the electronic communication to a trained classifier.

7. The method of claim 1, wherein the content comprises online content, and wherein the representation of the content comprises a link to the online content.

8. The method of claim 1, wherein the electronic communication is received from a website.

9. The method of claim 8, wherein the electronic communication is a message posted by the user on the website.

10. The method of claim 9, wherein the reply is returned to the user via a social networking website.

11. The method of claim 1, wherein words of the electronic communication are additionally matched to titles associated with online content.

12. The method of claim 11, wherein the words of the electronic communication are additionally matched to keywords associated with the online content.

13. The method of claim 12, wherein the words of the electronic communication are additionally matched to predefined rules associated with the online content.

14. The method of claim 1, additionally comprising:
receiving, over the network, feedback from the user relating to the reply.

15. The method of claim 1, wherein the content comprises online content, and wherein the method additionally comprises:
storing, using the computing device, the online content on a non-transitory computer-readable media operatively connected to the computing device, wherein the reply to the electronic communication comprises a link to the online content on the non-transitory computer-readable media.

16. The method of claim 1, wherein the content comprises online content, and wherein the method additionally comprises:
displaying the online content to the user, wherein the online content comprises a plurality of online content items; and
receiving a selection of one of the plurality of online content items from the user, wherein the reply to the electronic communication comprises a representation of the one of the plurality of online content items.

17. A non-transitory machine readable media embodying instructions, the instructions causing a data processing system to perform a m ethod, the method comprising:
receiving, over a network, an electronic communication comprising an explicit question by a user;
matching, using a computing device, the electronic communication to words in prior search queries that have been previously stored, wherein the prior search queries are associated with online content;
verifying that the electronic communication does not comprise content to be filtered out; and
returning, over the network, a reply to the electronic communication, the reply comprising a representation of the online content.

18. A computer system comprising:
a memory; and
at least one processor coupled to the memory to:
receive, over a network, an electronic communication comprising an explicit question by a user;
match the electronic communication to words in prior search queries that have been previously stored, wherein the prior search queries are associated with online content;
verifying that the electronic communication does not comprise content to be filtered out; and
return, over the network, a reply to the electronic communication, the reply comprising a representation of the online content.

* * * * *